United States Patent
Huang et al.

(10) Patent No.: US 10,333,958 B2
(45) Date of Patent: Jun. 25, 2019

(54) MULTI-DIMENSIONAL SYSTEM ANOMALY DETECTION

(71) Applicant: Cisco Technology, Inc., San Jose, CA (US)

(72) Inventors: Xinyuan Huang, San Jose, CA (US); Sarvesh Ranjan, Indore (IN); Olivia Zhang, Burlingame, CA (US); Yathiraj B. Udupi, San Jose, CA (US); Debojyoti Dutta, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 82 days.

(21) Appl. No.: 15/350,717

(22) Filed: Nov. 14, 2016

(65) Prior Publication Data

US 2018/0027004 A1   Jan. 25, 2018

Related U.S. Application Data

(60) Provisional application No. 62/364,104, filed on Jul. 19, 2016, provisional application No. 62/364,135, filed on Jul. 19, 2016.

(51) Int. Cl.
*H04L 29/06* (2006.01)
*H04L 12/26* (2006.01)
*H04L 12/24* (2006.01)

(52) U.S. Cl.
CPC ...... *H04L 63/1425* (2013.01); *H04L 41/0631* (2013.01); *H04L 43/04* (2013.01); *H04L 43/08* (2013.01); *H04L 63/162* (2013.01); *H04L 41/16* (2013.01)

(58) Field of Classification Search
CPC ... H04L 63/1425; H04L 63/162; H04L 43/04; H04L 43/08
See application file for complete search history.

(56) References Cited

U.S. PATENT DOCUMENTS 8,402,543 B1 * 3/2013 Ranjan ............... H04L 63/1416
                                                              709/223
8,779,370 B2   7/2014 Reinhard et al.
(Continued)

OTHER PUBLICATIONS

Chazal, et al., "Optimal rates of convergence for persistence diagrams in Topological Data Analysis", http://arxiv.org/pdf/1305.6239.pdf, 30 pages, May 2013, arXiv preprint arXiv:1305.6239.
(Continued)

*Primary Examiner* — Mohammad A Siddiqi
(74) *Attorney, Agent, or Firm* — Behmke Innovation Group LLC; James Behmke; Stephen D. LeBarron

(57) ABSTRACT

In one embodiment, a device in a network receives a first plurality of measurements for network metrics captured during a first time period. The device determines a first set of correlations between the network metrics using the first plurality of measurements captured during the first time period. The device receives a second plurality of measurements for the network metrics captured during a second time period. The device determines a second set of correlations between the network metrics using the second plurality of measurements captured during the second time period. The device identifies a difference between the first and second sets of correlations between the network metrics as a network anomaly.

18 Claims, 11 Drawing Sheets

(56) References Cited

U.S. PATENT DOCUMENTS

| | | | |
|---|---|---|---|
| 2007/0226099 | A1* | 9/2007 | Senturk-Doganaksoy .................. G06F 17/18 705/35 |
| 2012/0084860 | A1* | 4/2012 | Cao ..................... H04L 63/1441 726/23 |
| 2012/0311933 | A1* | 12/2012 | Reinhard ................ G01T 1/167 49/25 |
| 2013/0323744 | A1* | 12/2013 | Hahn ..................... G06F 19/20 435/6.12 |
| 2013/0338927 | A1* | 12/2013 | Kumaran ................ G01V 1/30 702/14 |
| 2014/0149806 | A1* | 5/2014 | Khalastchi ......... G06K 9/00496 714/49 |
| 2015/0047026 | A1* | 2/2015 | Neil .................... H04L 63/1425 726/22 |
| 2015/0169393 | A1* | 6/2015 | Shibuya .................. G06F 11/00 702/182 |
| 2015/0199224 | A1 | 7/2015 | Mihnev |
| 2015/0363699 | A1 | 12/2015 | Nikovski et al. |
| 2016/0043734 | A1 | 2/2016 | Frangou |
| 2016/0148103 | A1 | 5/2016 | Sarrafzadeh et al. |
| 2016/0210556 | A1 | 7/2016 | Ben Simhon et al. |
| 2016/0226737 | A1 | 8/2016 | Boubez |
| 2017/0359361 | A1* | 12/2017 | Modani ............... H04L 63/1425 |
| 2018/0083995 | A1* | 3/2018 | Sheth ................ G06F 17/30958 |

OTHER PUBLICATIONS

Chen, et al., "Robust Nonlinear Dimensionality Reduction for Manifold Learning", 18th International Conference on Pattern Recognition (ICPR'06), Hong Kong, pp. 447-450, IEEE.

"Curse of dimensionality", https://en.wikipedia.org/wiki/Curse_of_dimensionality, Jul. 30, 2016, 5 pages, Wikimedia Foundation, Inc.

Dey, Tamal K., "Persistent Homology", http://web.cse.ohio-state.edu/~tamaldey/course/CTDA/pers-homology.pdf, Notes by Tamal K. Dey, OSU, CSE 5339: Computational Topology and Data Analysis, pp. 24-31, 2013, OSU.

Edelsbrunner, et al., "Persistent homology—a survey." Surveys on Discrete and Computational Geometry. Twenty Years Later, Contemporary mathematics 453 (2008), pp. 257-282., Amer. Math. Soc., Providence, Rhode Island, 2008.

Gartley, et al., "Topological Anomaly Detection Performance with Multispectral Polarimetric Imagery", Algorithms and Technologies for Multispectral, Hyperspectral, and Ultraspectral Imagery XV, Proc. of SPIE vol. 7334, 73341O, 12 pages, 2009, SPIE.

Otter, et al. "A roadmap for the computation of persistent homology." http://arxiv.org/pdf/1506.08903v4.pdf, arXiv:1506.08903v4 [math.AT] 26 pages, May 2016, arXiv.

Pokorny, et al., "Topological Trajectory Clustering with Relative Persistent Homology", 8 pages, Sep. 2015, Preprint submitted to 2016 IEEE International Conference on Robotics and Automation.

Seversky, et al., "On Time-series Topological Data Analysis: New Data and Opportunities", http://www.cv-foundation.org/openaccess/content_cvpr_2016_workshops/w23/papers/Seversky_On_Time-Series_Topological_CVPR_2016_paper.pdf, 2016, pp. 59-67, The IEEE Conference on Computer Vision and Pattern Recognition Workshops.

Ye, et al., "Outlier Detection in the Framework of Dimensionality Reduction", Preprint submitted to Pattern Recognition, 22 pages, Mar. 2014.

Yunchao Gong; Locality Sensitive Hashing and Large Scale Image Search; UNC Chapel Hill; Slides 1-55.

Special Topic on Image Retrieval; Slides 1-57.

\* cited by examiner

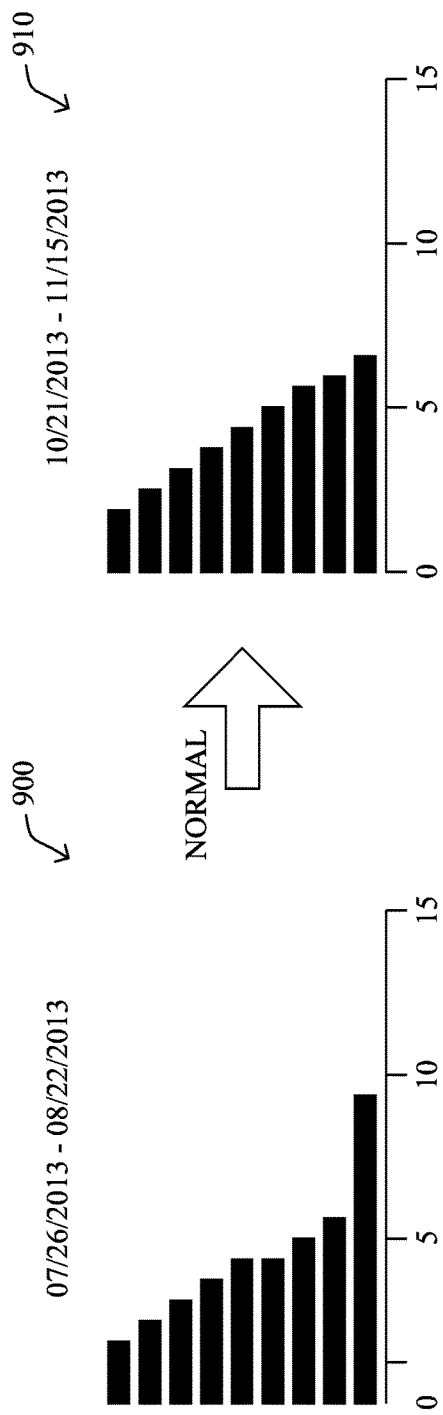
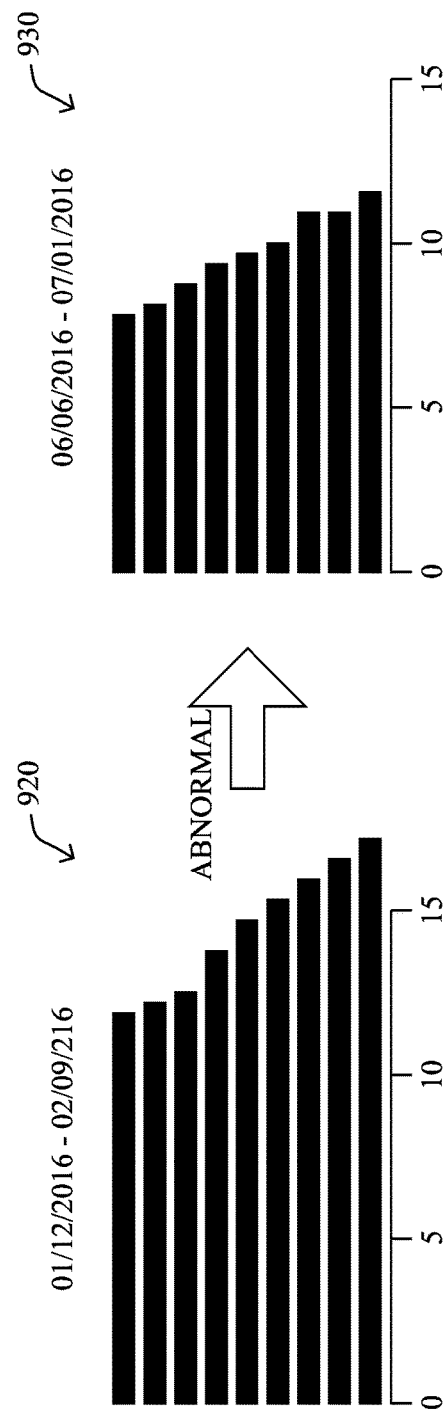
FIG. 9A
FIG. 9B

MULTI-DIMENSIONAL SYSTEM ANOMALY DETECTION

RELATED APPLICATIONS

This application claims priority to U.S. Provisional Application No. 62/364,104, filed on Jul. 19, 2016, entitled SYSTEM ANOMALY DETECTION USING SPECTRAL ANALYTICS, by Huang, et al., and U.S. Provisional Application No. 62/364,135, filed on Jul. 19, 2016, entitled MULTI-DIMENSIONAL ANOMALY DETECTION USING LOCALITY-SENSITIVE HASHING, by Ranjan, et al.

TECHNICAL FIELD

The present disclosure relates generally to computer networks, and, more particularly, to multi-dimensional system anomaly detection.

BACKGROUND

Anomaly detection is an emerging field with applicability to a wide number of areas, such as network threat detection/prevention, identifying misconfigured devices, and the like. In general, anomaly detection entails modeling the behavior of a system to identify behavioral changes over time. For example, in the case of detecting malware, many approaches are signature-based, meaning that these types of approaches detect specific types of malware by matching device behavior to a predefined behavioral pattern attributable to a malware type (e.g., virus A causes devices to exhibit behavior B). In contrast, anomaly detection may simply assess whether or not the behavior of the device has significantly changed. Both approaches are often complimentary and can be used together, in some systems.

While analyzing a single behavioral metric over time is relatively straightforward for purposes of anomaly detection, many communication systems and devices exhibit complex behaviors with highly dimensional metrics.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A-9B illustrate examples of anomaly detection using a persistent homology-based approach.

DESCRIPTION OF EXAMPLE EMBODIMENTS

Overview

Figure 1A:
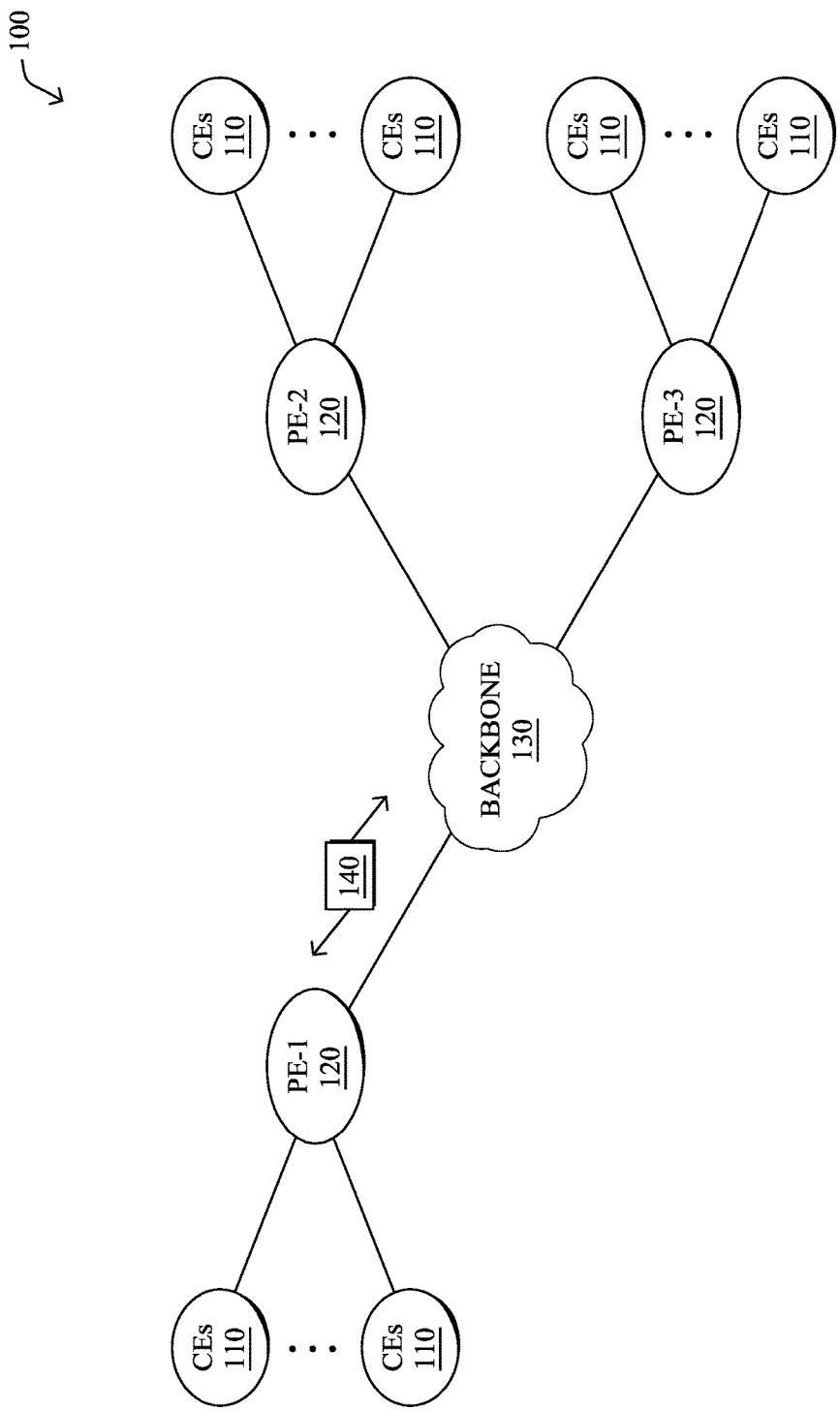
FIGS. 1A-1B illustrate an example communication network.

According to one or more embodiments of the disclosure, a device in a network receives a first plurality of measurements for network metrics captured during a first time period. The device determines a first set of correlations between the network metrics using the first plurality of measurements captured during the first time period. The device receives a second plurality of measurements for the network metrics captured during a second time period. The device determines a second set of correlations between the network metrics using the second plurality of measurements captured during the second time period. The device identifies a difference between the first and second sets of correlations between the network metrics as a network anomaly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
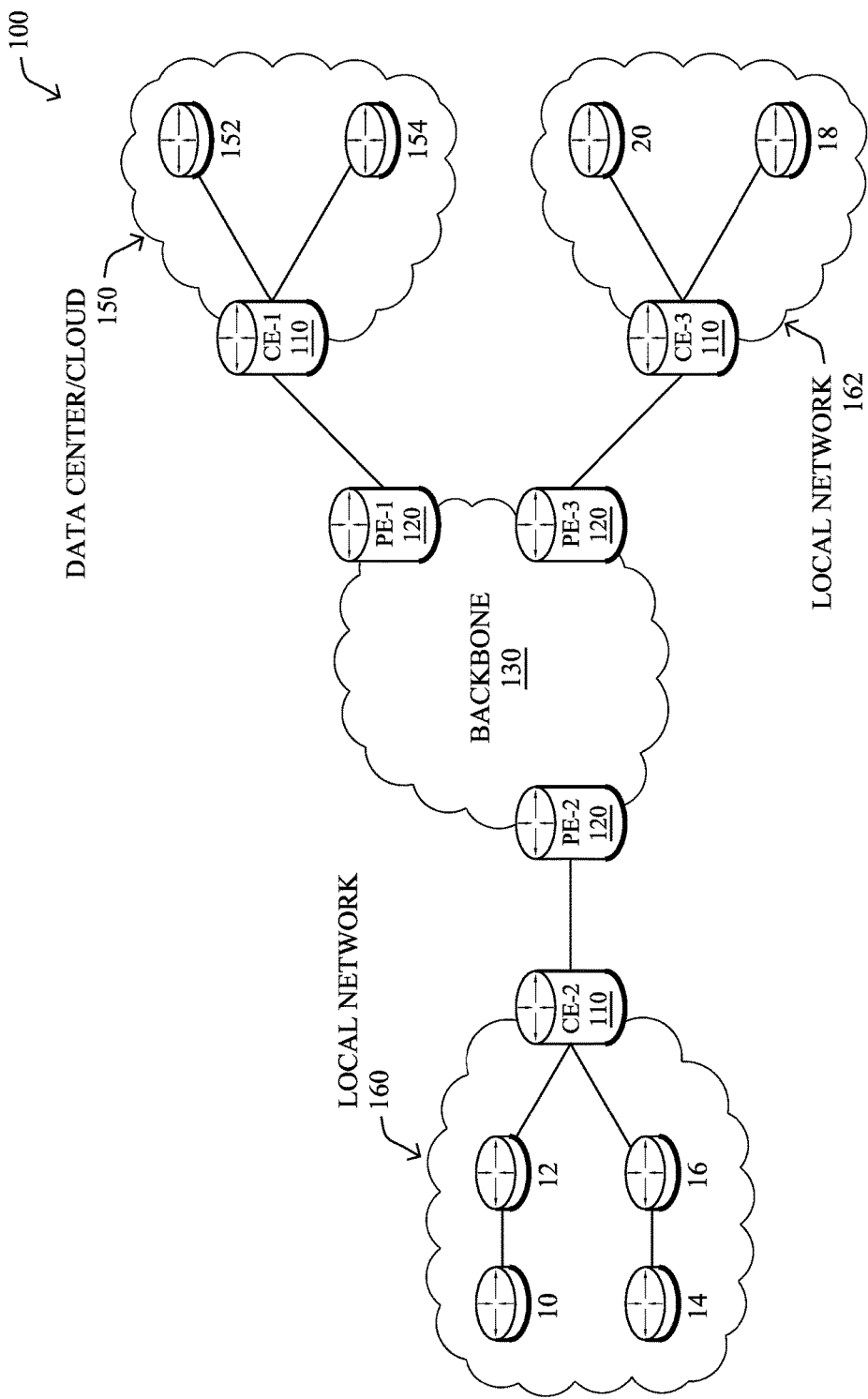

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
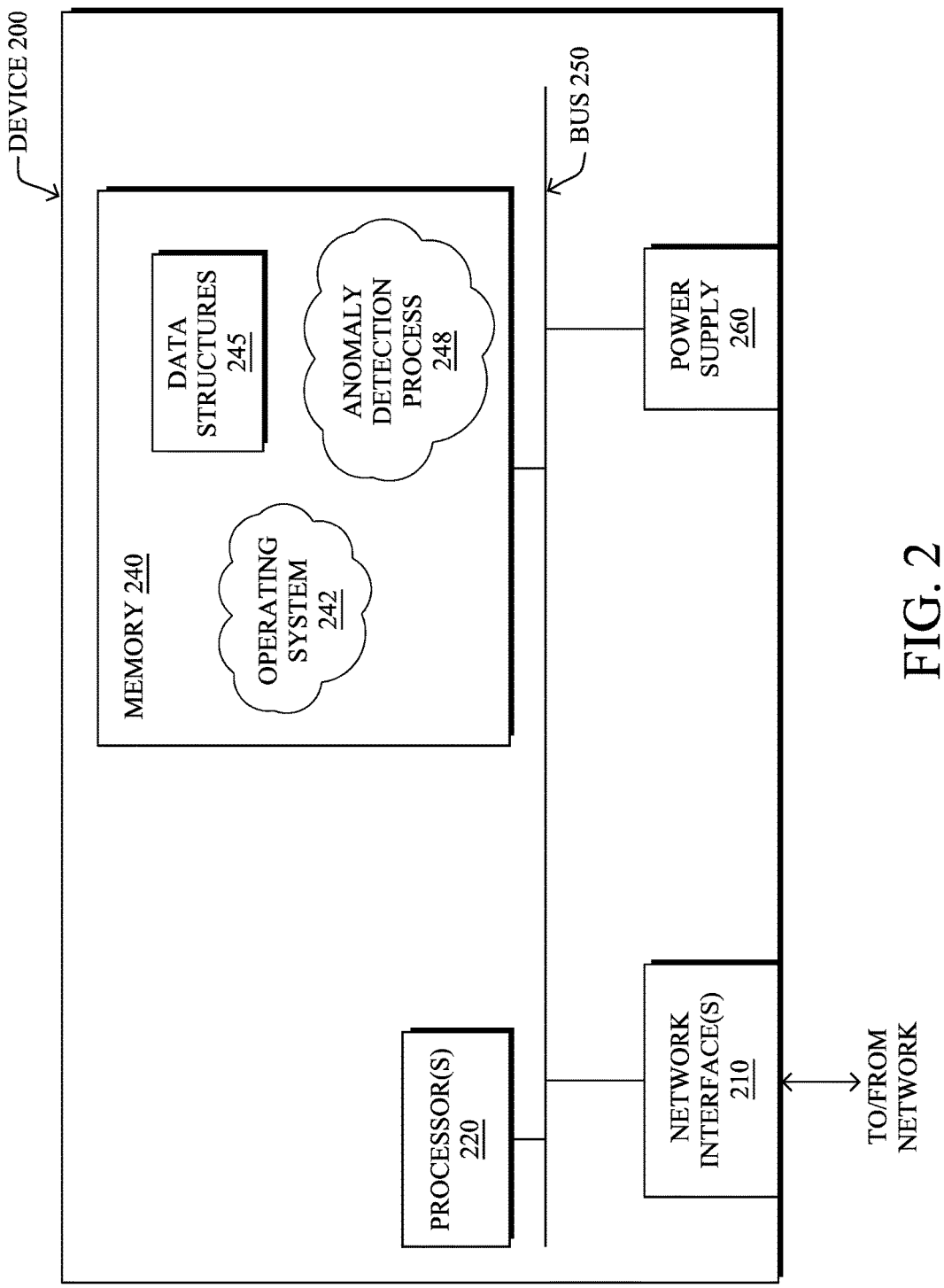
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, an anomaly detection process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

Anomaly detection process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Anomaly detection process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. Anomaly detection process 248 may advantageously identify these forms of misconfigurations, in order to be detected and fixed.

In various embodiments, anomaly detection process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, anomaly detection process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
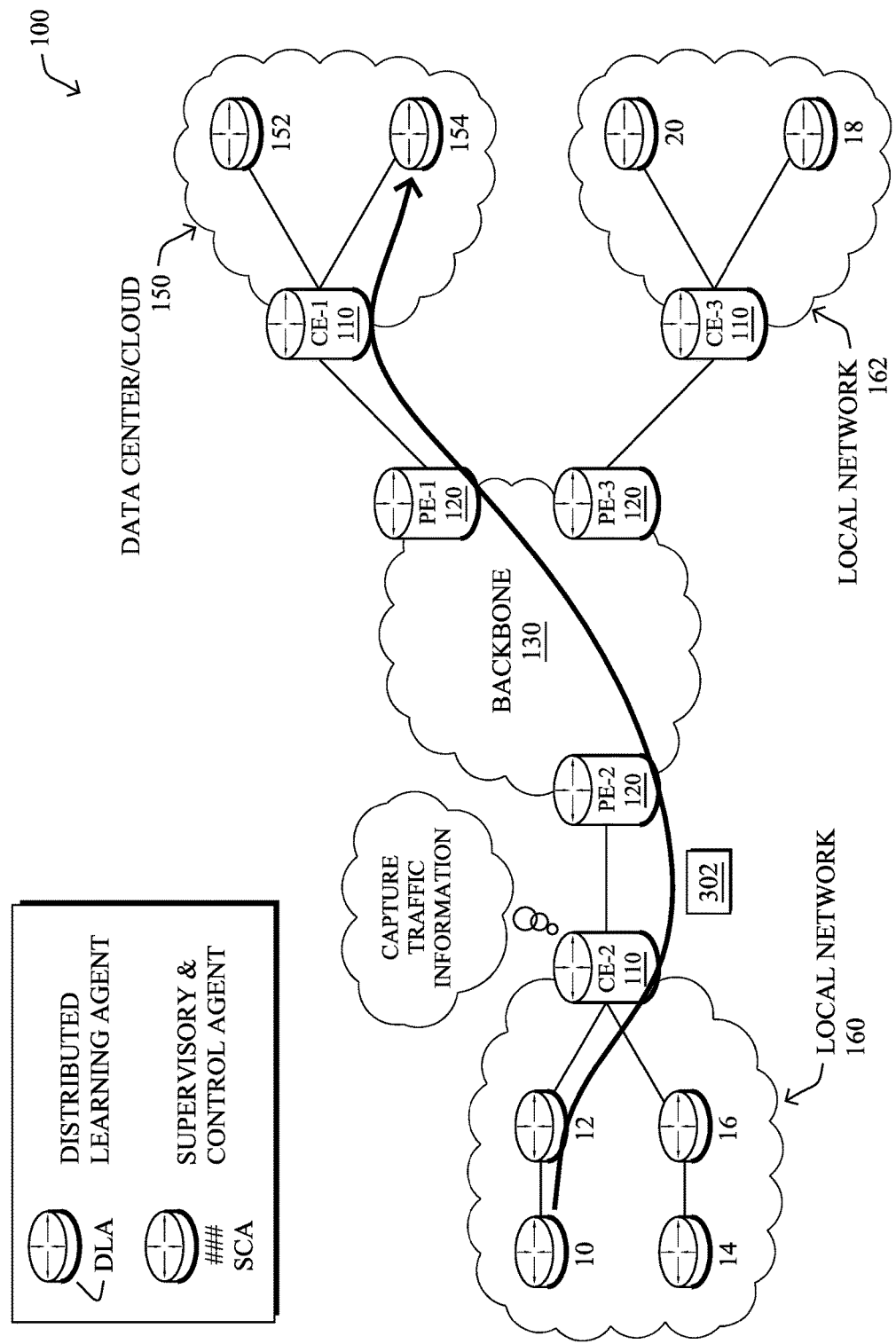
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

As noted above, the behavior of communication networks and devices is often complex and may be represented by a high-dimensional time series that takes into account a large number of different metrics/dimensions. However, as the number of dimensions grows, so too do the effects of the phenomenon known as the "Curse of Dimensionality." For example, a high-dimensional anomaly detector may assess a large number of irrelevant attributes, produce anomaly scores that have no semantic meaning, produce incomparable scores across different subspaces of the feature space, etc.

To avoid the Curse of Dimensionality, many anomaly detection techniques focus on single-dimensional analysis or assess only pairs of dimensions. However, doing so also disregards a potential indicator of anomalous behavior: changes in the relationships between metrics. Notably, individual metrics may continue to appear "normal" from a behavioral standpoint while their relationships may change over time.

Multi-Dimensional System Anomaly Detection

The techniques herein allow for the detection of anomalies through the analysis of correlation changes between different metrics that may change from one (normal) state to another. In some aspects, the techniques herein redefine the problem of anomaly detection in high-dimensional/complex systems using multi-dimensional time series to identify when the characteristics of the correlation matrix diverge. In a further, the techniques herein may train a model based on the spectral properties of the correlation matrix and use this to determine thresholds for anomalous behavior. In another aspect, the techniques may use a locality-sensitive hashing approach to detect changes in the correlations among different dimensions. In a further aspect, the techniques herein may use a persistent homology-based approach to detect topological changes structure of the data, to detect anomalies.

Illustratively, the techniques described herein may be performed by hardware, software, and/or firmware, such as in accordance with the anomaly detection process 248, which may include computer executable instructions executed by the processor 220 to perform functions relating to the techniques described herein, e.g., in conjunction with other processes, accordingly.

Specifically, in various embodiments, a device in a network receives a first plurality of measurements for network metrics captured during a first time period. The device determines a first set of correlations between the network metrics using the first plurality of measurements captured during the first time period. The device receives a second plurality of measurements for the network metrics captured during a second time period. The device determines a second set of correlations between the network metrics using the second plurality of measurements captured during the second time period. The device identifies a difference between the first and second sets of correlations between the network metrics as a network anomaly.

Operationally, based on the observation as stated above, the techniques herein propose a new method that can detect potential anomalies from multi-dimensional time series metrics by analyzing changes in the correlation (co-variance) matrix. The techniques herein are applicable to any system that "emits" multi-dimensional, time series data. For example, in a communication network, measurements may be taken over time regarding any number of metrics such as, but not limited to, traffic endpoints (e.g., source and/or destination), traffic types, traffic protocols, traffic byte sizes, bandwidth usage, jitter, loss, delays, system resource usage (e.g., memory, CPU, queues, etc.), and the like. In various embodiments, the techniques herein may detect an anomaly by analyzing correlation changes among the different metrics/dimensions over time.

Figure 4:
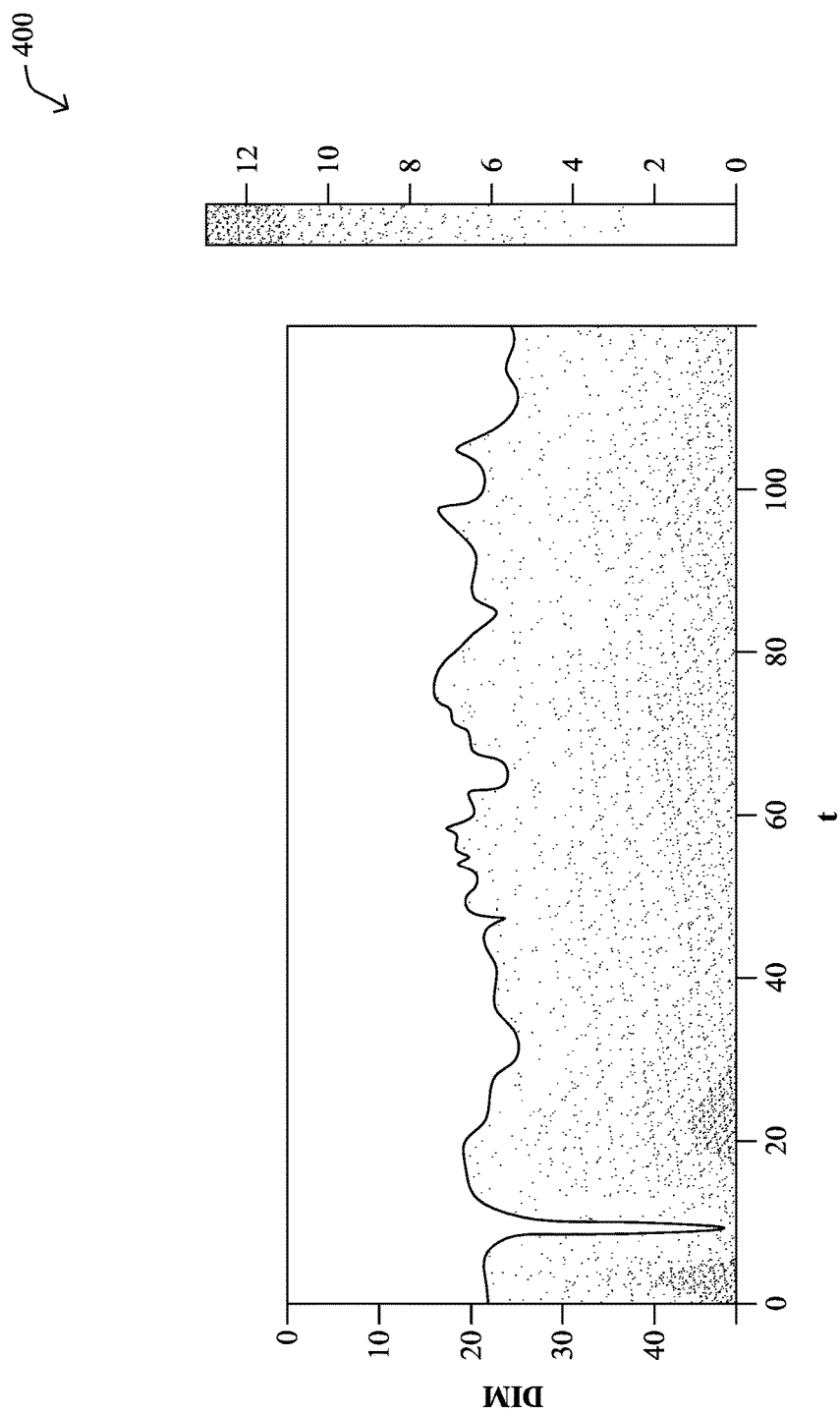
FIG. 4 illustrates an example plot of eigenvalues derived from a series of graph Laplacian matrices, which are derived from correlation matrices of system metrics.

Referring now to FIG. 4, an example plot 400 of eigenvalues derived from a correlation matrix of system metrics is shown. In particular, plot 400 is an intensity/colormap (shown in greyscale) of the first 50 eigenvalues of a Laplacian over twenty time steps, which was derived from the correlation matrices of a set of time series metrics. As shown, a significant change of the eigenvalues can be observed around the timespan $t=8$ to $t=11$, where the intensity in the colormap suddenly drops, indicating a potential "disconnection" or "asynchronicity" in the system.

Figure 5:
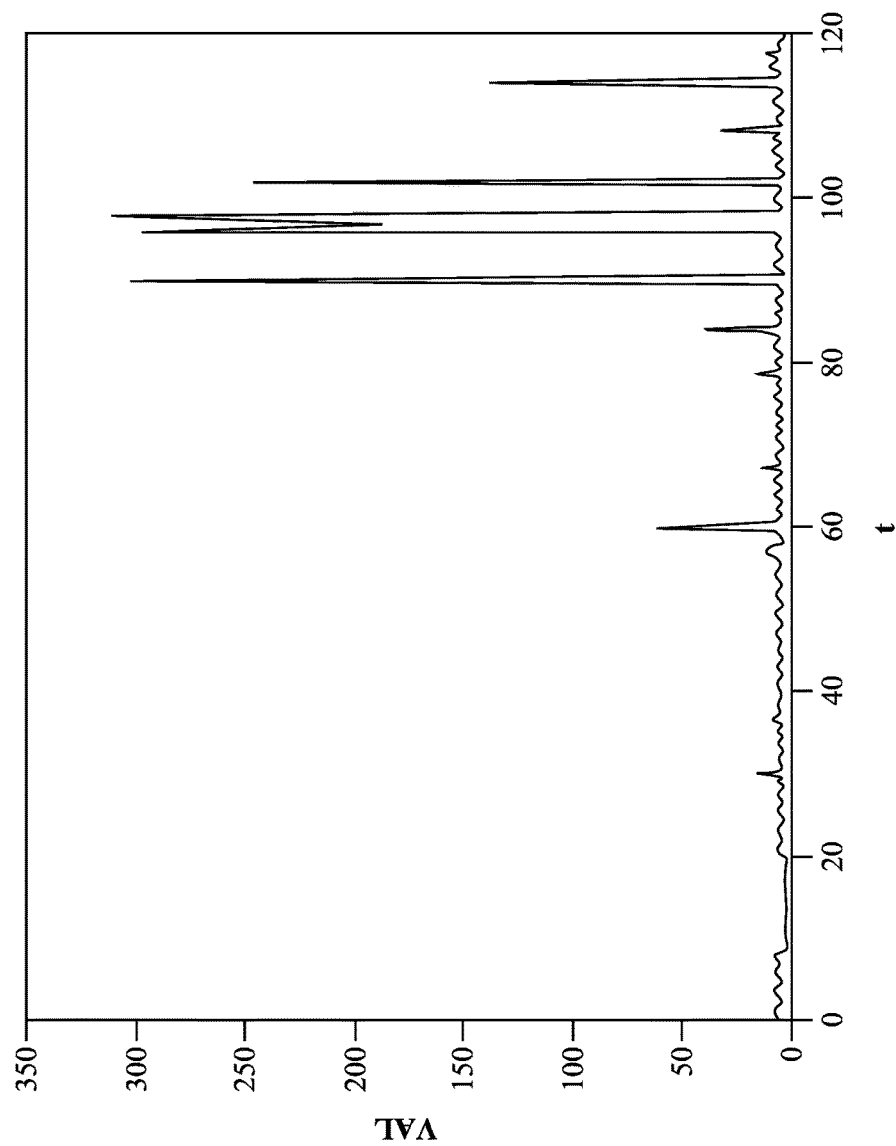
FIG. 5 illustrates an example plot of a time series of system metrics.

FIG. 5 illustrates an example plot 500 of one of the corresponding time series metrics for plot 400 in FIG. 4. As shown, a small drop in a subset of metrics also occurs around the same time as in FIG. 4. As would be appreciated, due to the large dynamic range of the time series, where large values are actually considered normal, the small drops in metrics or similar behaviors may not be detected easily as an anomaly by simply looking at the individual metrics. However, analyzing their correlations could potentially indicate these anomalies, as described below.

In some embodiments, the device executing the anomaly detection process (e.g., process 248) may first operate in a learning phase. During this stage, the device may perform any or all of the following:

1. Take un-labelled time series data (e.g., measured metrics) from a moving window and maintain a correlation matrix with the window moving forward. Such metrics may be collected, for example, from any deployed monitoring services on the node(s) in the network and/or on the device itself (e.g., IPFIX records, Netflow records, etc.).
2. Apply spectral analysis and extract the top-k eigenvalues of the graph Laplacian matrix, to obtain the properties of correlation graph structure (of the different dimensions in time series).
3. Train a statistical model of the extracted spectra.
4. Potentially evaluate the robustness of the model using matrix perturbation.

Once the model has been trained, the device may enter into an anomaly detection phase that includes any or all of the following:

1. Extract the spectra in the same way as in learning phase.
2. Compare the spectra against the model generated in the learning phase, to calculate an error/difference measurement. If the error then exceeds a predefined threshold, anomaly detection process 248 may then raise an anomaly flag or initiate other corrective measures (e.g., capturing network packets for further/deeper inspection, rerouting traffic, dropping traffic, etc.).

Figures 6A, 6B:
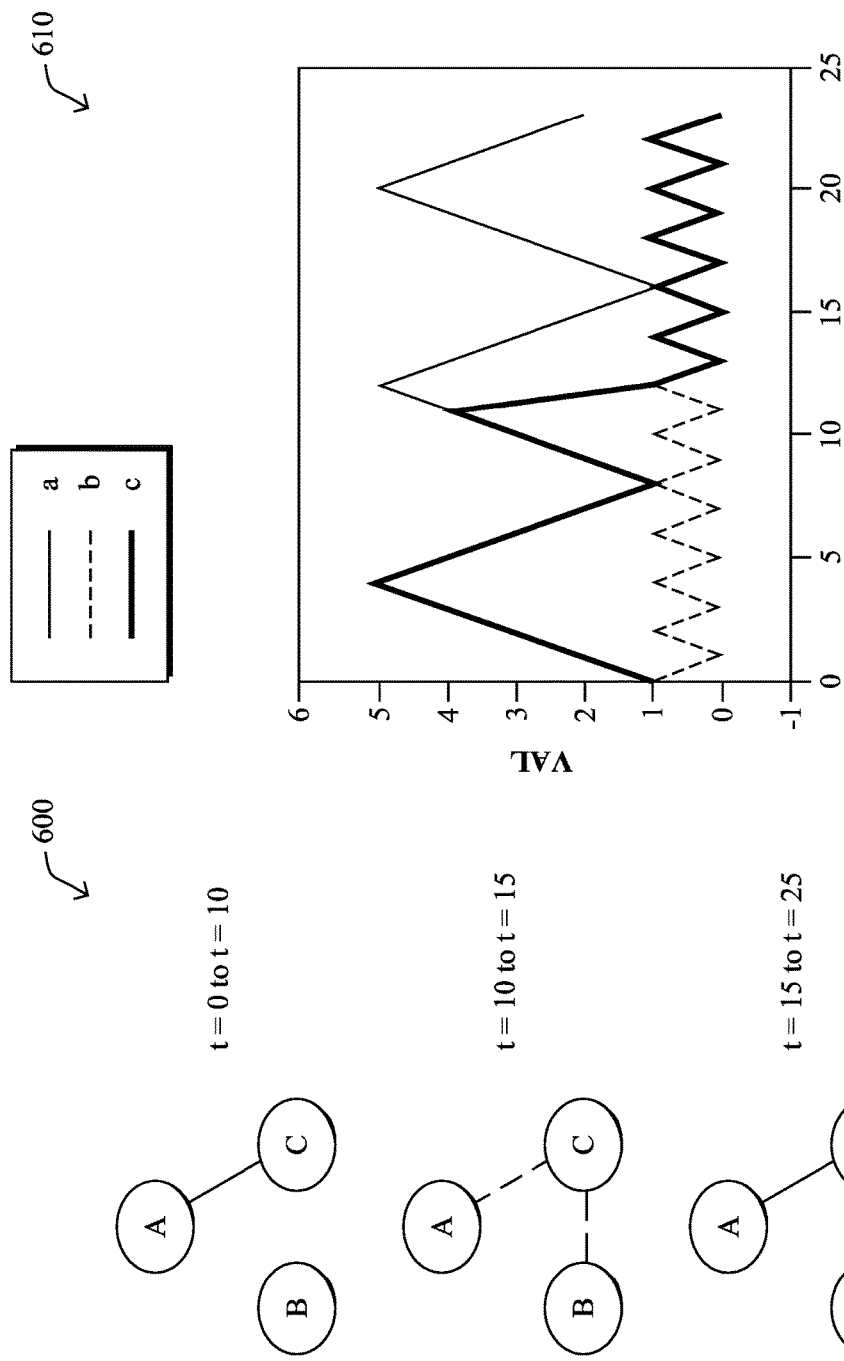
FIGS. 6A-6B illustrates an example of the assessment of spectral properties of the correlation of system metrics.

By way of example of the spectral analysis approach, FIGS. 6A-6B illustrates an example of the assessment of spectral properties of the correlation of system metrics. As show in time series 600 in FIG. 6A, assume that there are three metrics/dimensions under analysis, A-C. Between times $t=0$ and $t=10$, metrics/dimensions A and C may be closely correlated, as shown in FIG. 6B. However, between times $t=10$ and $t=15$, metric/dimension C may transition from being correlated to metrics/dimension A to being correlated to metric/dimension B. Then, from time $t=15$ to $t=25$, metrics/dimensions B and C may continue to remain correlated. As would be appreciated, a single dimension anomaly detector will have difficulty detecting the change. Instead, the techniques herein propose looking for fundamental changes in the system itself by using spectral analysis on the underlying time series.

The techniques described herein, therefore, provide for system anomaly detection using spectral analytics. In particular, the techniques herein apply anomaly detection based on the change of correlation among multi-dimensional time series (e.g., "the correlation matrix"), which is very different from current techniques. Also, the techniques herein leverage fast matrix operations to do anomaly detection, which can be accelerated by hardware, while current technologies (e.g., ranking of metrics pairs and clustering) are much less efficient.

In further embodiments, the anomaly detector may use locality-sensitive hashing, to detect anomalous metrics and potentially anomalous timestamps, using multi-dimensional analysis. In particular, the detector may use random hyperplanes and locality-sensitive hashing, to hash a sliding window's worth of points in a time series and detect anomalies by comparing the buckets of the locality-sensitive hash family. Notably, this approach may generally be considered an unsupervised learning method.

In general, locality-sensitive hashing is performed by first plotting data to a low-dimensionality, binary (Hamming) space. In other words, each data point/measured metric is mapped to a vector of b-bits, also referred to as the hash key. Each hash function h must then satisfy the locality-sensitive hashing property as follows:

$$Pr[h(x_i)=h(x_j)]=\text{sim}(x_i,x_j)$$

where $\text{sim}(x_i, x_j) \in [0, 1]$ is the similarity function of interest. In addition, the hashing function for hyperplanes is defined as follows:

$$h_r(x) = \begin{cases} 1, & \text{if } r^T x \geq 0 \\ 0, & \text{otherwise} \end{cases}$$

To implement the locality-sensitive hashing approach, the anomaly detector may generally perform any or all of the following:

1.) Divide the n by d feature space of metrics in two, using a random hyperplane. Then, every point in the space (e.g., measurement) will hash to either a 0 or 1, based on the side of the hyperplane in which the point is located. As noted, the hyperplane itself is a hash function. Note that two points near each other will generally hash to the same bit (same side of the hyperplane). This family of hash functions is known to be locality-sensitive.

Figure 7B:
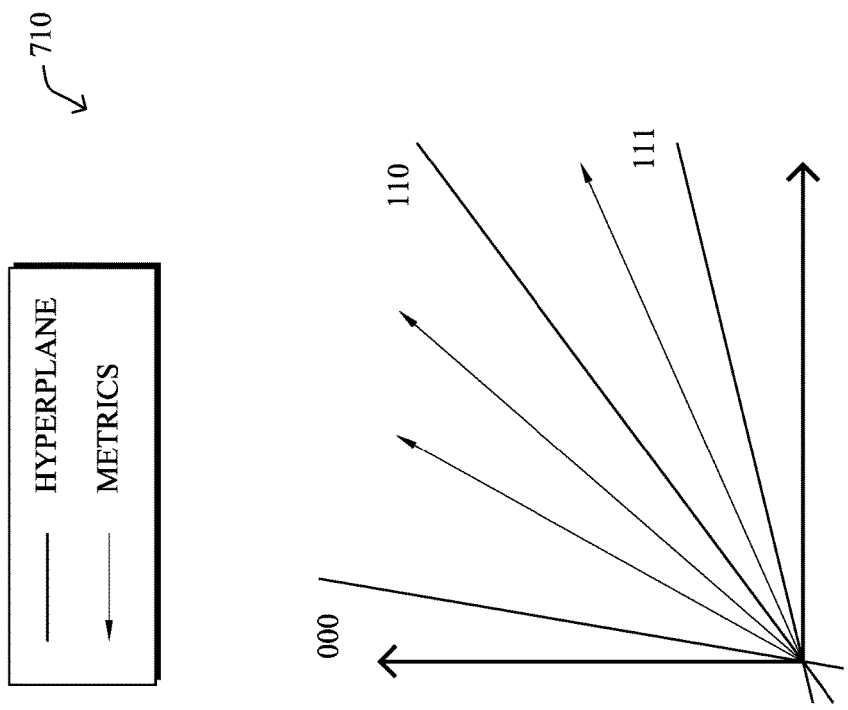
FIGS. 7A-7B illustrates an example of using locality-sensitive hashing on system metrics.
Figure 7A:
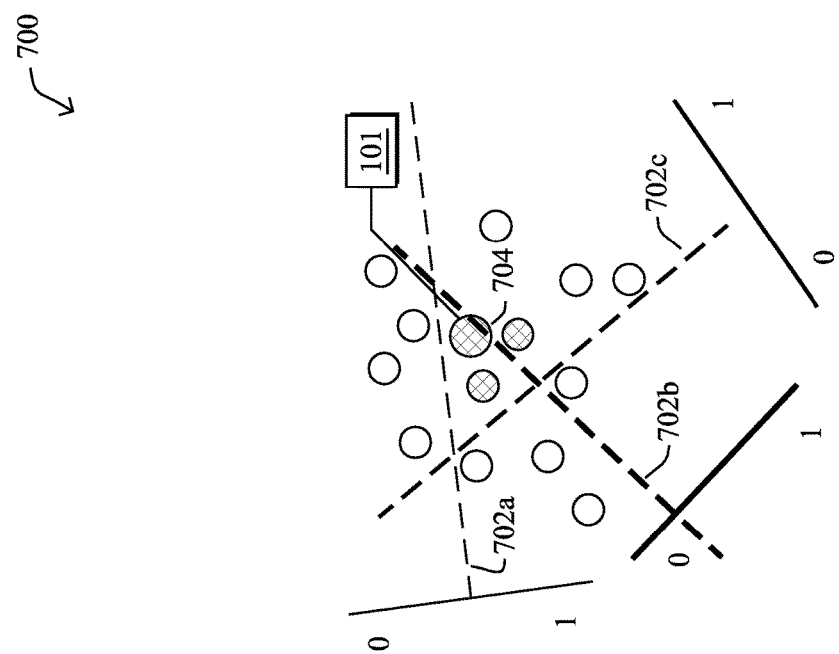

The anomaly detector may repeat this division k-number of times to form k-number of hyperplanes/hash functions. An example of this division is shown in FIG. 7A in which three random hyperplanes 702a-702c are generated for feature space 700 of the metrics under analysis. Each point (e.g., set of measurements) can now be hashed into k bits, and two points close to each other will generally have a low Hamming distance. For example, a hash of point 704 shown in FIG. 7A may be '101' based on its location relative to hyperplanes 702a-702c. In other words, as shown in plot 710 in FIG. 7B, any given point may take on a hash value based on its location in the feature space relative to the randomly generated hyperplanes.

2.) For a given time series, slide a window and consider all points in the window, to create a multi-dimensional data set. The detector can then use the above locality-sensitive hashing to hash the data set, from which anomalies may be found.

In particular, the anomaly detector may detect anomalous timestamps as follows:

1.) Create the input data matrix. (results in a n by d matrix, where n is the number of data points in the window, and d is the number of metrics)
2.) Create random hyperplanes. (results in a d by l matrix, where d is the number of metrics, and l is the number of hyperplanes)
3.) Project the input data matrix onto the hyperplanes by taking the Vector Product (results in a n by l matrix), and hash the projections into a set of buckets so that similar projections (i.e. time points where metrics have similar values) are hashed into same buckets.
4.) Create a key-value mapping where the keys are the bucket identifiers, and the value of each key is its frequency of occurrence.
5.) Track the occurrence frequency of the buckets, and if the frequency shows abnormal behaviors (e.g. goes below a threshold), its corresponding data points are considered anomalous.

The anomaly detector can also adapt the above to detect anomalous metrics themselves. Notably, the anomaly detector may assess the transpose of the input data matrix, to create a d×n space, and then project the matrix onto the hyperplanes. By normalizing each time series with respect to the mean and standard deviation, similar points in the space would then represent correlated dimensions. To do so, the anomaly detector may perform any or all of the following:

1.) Create a transpose of the input data matrix. (results in a d by n matrix, where n is the number of data points in the window, and d is the number of metrics)
2.) Normalize each metric as needed.
3.) Create random hyperplanes. (results in a n by l matrix, where n is the number of data points in the window, and l is the number of hyperplanes)
4.) Project input data matrix on hyperplanes by taking Vector Product. (results in a d by l matrix), and
5.) Hash the projections to a set of buckets such that similar projections (i.e., metrics with similar time series patterns) will be hashed into same buckets.

The anomaly detector can then detect anomalies by comparing the hash buckets of two time windows and then comparing their neighborhood structures, to identify the exact dimensions that changed in behavior. Notably, for each time step, the above approach will yield a set of hash buckets. In turn, the anomaly detector may perform the following:

1.) Create a signature for each bucket by hashing it based on its members (i.e. metrics belonging to it), so that if bucket_m and bucket_n from two different time steps have similar members then bucket_m and bucket_n will have the same signature.
2.) Maintain a count of each signature's occurrence and update the count at each time step, as well as a count of each member's occurrence within each signature. Thus by finding frequently occurring signatures and the frequently occurring members within each of those signatures, the anomaly detector is able to find groups of metrics that are normally correlated over time.
3.) If an anomalous time period is found, the anomaly detector may look at changes in each group of normally-correlated metrics found above. If a subset of the metrics left its corresponding group for a period of time, then the anomaly detector may identify the subset of metrics as anomalous.

The techniques described herein, therefore, provide for multi-dimensional anomaly detection using locality-sensitive hashing. In particular, the techniques herein work for multiple dimensional data sets including time series data, are generally very fast, and can be used in a streaming fashion.

According to various embodiments, an anomaly detector may also detect changes between different dimensions within a multidimensional time series using topological analysis. In particular, rather than assess the geometric properties of the time series, the detector may instead identify changes in the topological structure of the data as an anomaly. In some embodiments, the detector may learn a normal, persistent homology from a sliding time window and then, during the detection phase, compute changes to the persistence diagram.

In general, persistent homology attempts to reconstruct the topological features of an underlying space, given a data point sampled from the space. To do so, a number of definitions are provided:

Definition 1: A k-simplex is the convex hull of k+1 vertices and, more intuitively, the k-dimensional generalization of point, line, triangle, tetrahedron, etc. A k-simplicial complex K is a set of simplices of dimension at most k where, for any simplex s in K, any face t of s is also in K.

Definition 2: Given a set of data points, a k-complex of resolution r is the set of all simplices of dimension at most k whose vertices have pairwise distances of at most r. A topological feature is said to "be born" at r if it exists at resolution r but for no smaller resolution, and said to "die" at r if it exists at resolution r but for no larger resolution.

Definition 3: A persistence diagram comprises the x-y plane on which the diagonal x=y has infinite multiplicity, and where any point (i, j) has multiplicity equal to the number of features born at i that die at j.

To then construct a persistence diagram, a sequence of simplicial complexes is constructed over varying resolution r. The birth and death resolutions of each topological feature (i.e., homology generator) can then be stored as a coordinate pair, from which the persistence diagram can be drawn.

Said differently, assume that each measurement/data point is sampled from some manifold. The goal then is to reconstruct the manifold and track its topological features, such as clusters and holes. To do so, points within r distance of one another are connected and "barcodes" of the resulting topological features characterize the data set. The resolution r is then varied, to identify "persistent" features that exist for many different values of r.

Figure 8:
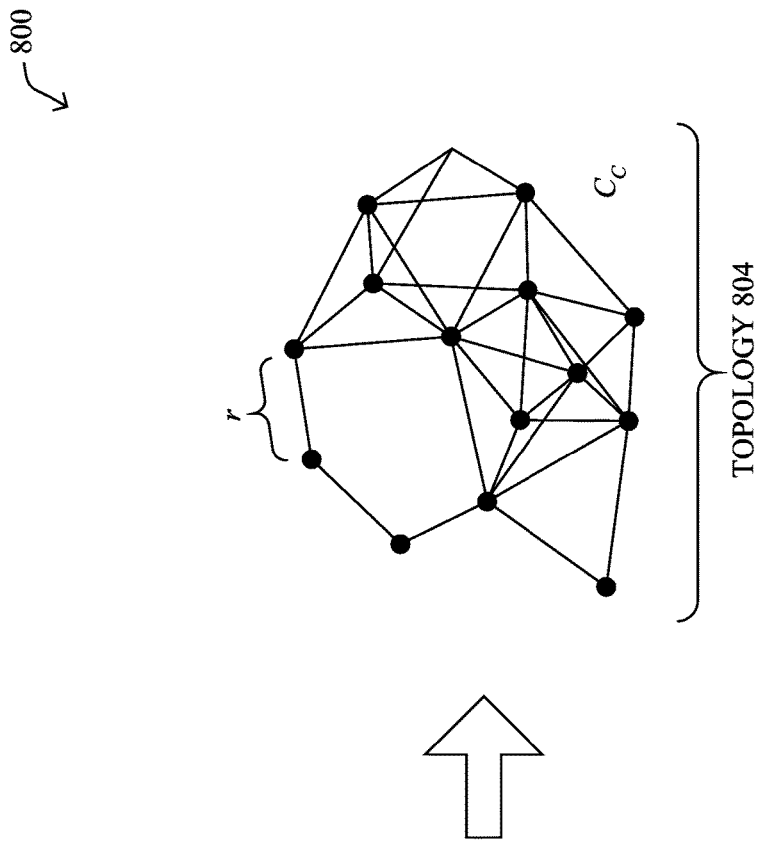
FIG. 8 illustrates an example of performing topological analysis.
Figure 8:
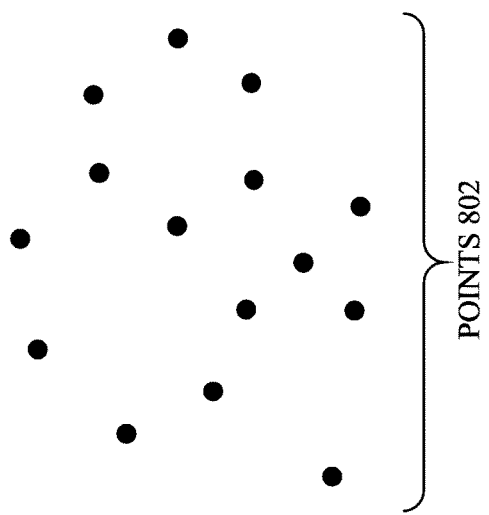

By way of example, FIG. 8 illustrates an example of performing topological analysis using persistent homology techniques. As shown, assume that there are data points 802 (e.g., measured metrics from the system) that exist in a multi-dimensional space. By selecting a resolution (e.g., a value for r), points 802 within r distance of one another are connected, thereby forming topology 804. A barcode of topology 904 would then be its topological features, such as its clusters and holes. This process may be repeated any number of times computationally with different values of r, to identify the persistent features of the resulting topologies.

To detect anomalies using persistent homology-based techniques, the anomaly detector may operate first in a learning phase and then in a detection phase. In the learning phase, the anomaly detector may take a time series from a sliding window and maintain a persistence diagram using the above techniques. The anomaly detector may store such a diagram as a set of 2-D points, e.g., {birth, death}, of each topological feature. This also allows the anomaly detector to compute an asymptotic confidence set for the bottleneck distance. Said differently, the anomaly detector may develop a "normal" barcode signature over the sliding time window during the learning phase.

In the detection phase, the anomaly detector may compute a new persistence diagram in the same way as above, using the current measurements. In turn, the anomaly detector may compute the bottleneck distance (e.g., anomaly score) between the new persistence diagram and the "normal" persistence diagram. In other words, if the barcode of the new time window is significantly different than that of the "normal" (e.g., above a predefined threshold), the anomaly detector may identify this condition as an anomaly and take any number of measures, accordingly (e.g., generating an alert, effecting a change in the treatment of network traffic, etc.).

FIGS. 9A-9B illustrate examples of anomaly detection using a persistent homology-based approach, according to various embodiments. As shown in FIG. 9A, assume that plot 900 represents the persistence diagram computed by an anomaly detector for a first time window/period (e.g., Jul. 26, 2013-Aug. 22, 2013). In turn, the anomaly detector may compute a second persistence diagram for a subsequent time period (e.g., Oct. 21, 2013-Nov. 15, 2013), as represented by plot 910. As the bottleneck distance between the two is relatively small (e.g., there is little change in the majority of the topological features), the anomaly detector may determine that the system or device is operating normally and that an anomaly does not exist. In FIG. 9B, in contrast, there is a noticeable difference in the topological features between the persistence diagrams represented by plots 920 and 930, respectively. Accordingly, the anomaly detector may, based on the bottleneck difference exceeding an anomaly threshold, determine that an anomaly now exists and take any number of measures, accordingly.

Figure 10:
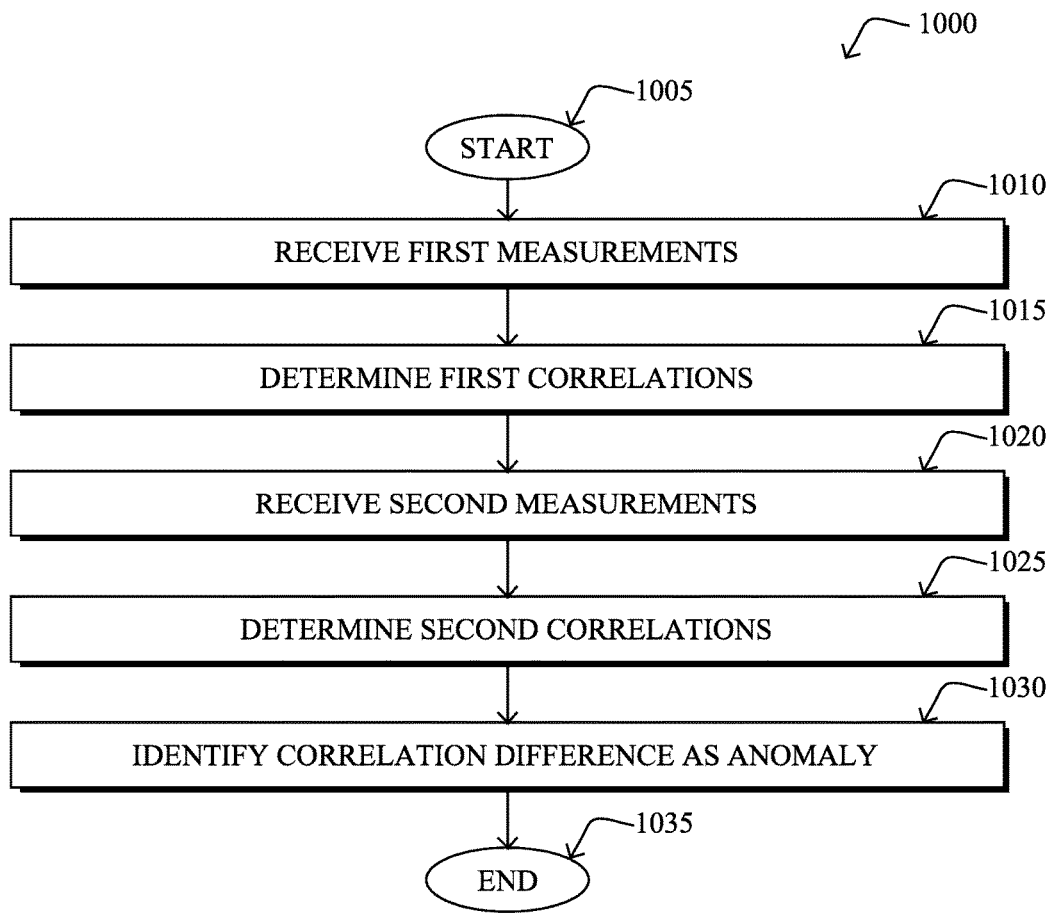
FIG. 10 illustrates an example simplified procedure for performing multi-dimensional system anomaly detection.

FIG. 10 illustrates an example simplified procedure for performing multi-dimensional system anomaly detection in a network, in accordance with one or more embodiments described herein. For example, a non-generic, specifically configured anomaly detector (e.g., a device 200 in a network) may perform procedure 1000 by executing stored instructions (e.g., process 248). The procedure 1000 may start at step 1005, and continues to step 1010, where, as described in greater detail above, the device may receive a first plurality of measurements for metrics regarding the network captured during a first time period/window. Generally, the metrics may be any form of raw or derived metrics (e.g., statistics, etc.) regarding a specific node in the network, a set of nodes in the network, one or more path segments in the network, one or more paths in the network, one or more traffic flows in the network, or the like. For example, the metrics may include, but are not limited to, available resources of a node, a traffic flow byte size, protocols or traffic types, network metrics (e.g., bandwidth usage, jitter, drops, delays, etc.), or any other metrics that may indicate the health of the network under analysis.

At step 1015, as detailed above, the device may determine a first set of correlations between the network metrics using the measurements from step 1010. Notably, and in contrast to anomaly detection techniques that simply look for changes in the tracked metrics, the device may instead assess the correlations between the measured metrics. In some embodiments, the device may use spectral analysis to assess the correlations. In further embodiments, the device may use locality sensitive hashing or topological analysis (e.g., persistent homology techniques), to assess the correlations.

At step 1020, the device may receive a second set of measurements for the network metrics, as described in greater detail above. The second set of measurements may have been captured during a second time period/window.

At step 1025, as detailed above, the device may determine a second set of correlations between the metrics based on the measurements captured during the second time period. For example, the device may perform similar analysis of the second set of measurements as that of the first set of measurements in step 1015.

At step 1030, the device may identify a difference between the first and second sets of correlations as an anomaly, as described in greater detail above. Notably, even if the individual metrics have not changed significantly enough to raise an anomaly, the device may nonetheless determine that an anomalous condition exists by assessing changes in the correlations between the network metrics. Doing so may also allow for a multi-dimensional analysis while avoiding the Curse of Dimensionality. Based on the detection, the device may cause any number of mitigation actions to occur such as, but not limited to, generating an anomaly alert, causing the capture of certain network traffic (e.g., to perform deep packet inspection, etc.), initiating a maintenance action, or the like.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for anomaly detection in a network by assessing changes in the correlation of network metrics. In some aspects, the techniques herein can leverage fast matrix operations which can be accelerated via hardware, in contrast to other anomaly detection techniques that rank metric pairs and rely on clustering. In further aspects, the techniques herein can handle a large number of dimensions of data using a sliding window that is smaller than the actual number of dimensions, thus partially avoiding the Curse of Dimensionality.

While there have been shown and described illustrative embodiments that provide for anomaly detection in a network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a device in a network, a first plurality of measurements for network metrics captured during a first time period;
    determining, by the device, a first set of correlations between the network metrics using the first plurality of measurements captured during the first time period;
    receiving, at the device, a second plurality of measurements for the network metrics captured during a second time period;
    determining, by the device, a second set of correlations between the network metrics using the second plurality of measurements captured during the second time period;
    in response to determining the first and second sets of correlations, generating, by the device, a plurality of persistence diagrams based on the first and second sets of correlations as sets, each diagram of the plurality of persistence diagrams a set of topological features associated with the first and second sets of correlations;
    computing, by the device, a distance between at least two of the plurality of generated persistence diagrams, wherein the distance represents an anomaly score associated with a change in the topology of the network; and
    identifying, by the device, a difference between the first and second sets of correlations between the network metrics as a network anomaly based on the anomaly score.

2. The method as in claim 1, further comprising:
    generating, by the device, an alert indicative of the network anomaly.

3. The method as in claim 1, further comprising:
    projecting, by the device, the first and second pluralities of measurements onto one or more hyperplanes that each comprise a hash function, to generate measurement signatures; and
    using, by the device, the measurement signatures to determine the first and second sets of correlations.

4. The method as in claim 3, wherein the measurement signatures comprises hashes of the projected first and second pluralities of measurements.

5. The method as in claim 1, further comprising:
    performing, by the device, spectral analysis on the first and second pluralities of measurements, to determine the first and second sets of correlations.

6. The method as in claim 1, wherein the topological features comprise clusters and holes of one or more manifolds in which measurements from the first or second pluralities of measurements are data points in the one or more manifolds.

7. The method as in claim 1, wherein the network metrics comprise at least one of: a byte size of a traffic flow, a time associated with a traffic flow, or an available resource of a node in the network.

8. An apparatus, comprising:
    one or more network interfaces to communicate with a network;
    a processor coupled to the network interfaces and configured to execute one or more processes; and
    a memory configured to store a process executable by the processor, the process when executed operable to:
    receive a first plurality of measurements for network metrics captured during a first time period;
    determine a first set of correlations between the network metrics using the first plurality of measurements captured during the first time period;
    receive a second plurality of measurements for the network metrics captured during a second time period;
    determine a second set of correlations between the network metrics using the second plurality of measurements captured during the second time period;
    in response to determining the first and second sets of correlations, generate a plurality of persistence diagrams based on the first and second sets of correlations as sets, each diagram of the plurality of persistence diagrams a set of topological features associated with the first and second sets of correlations;

compute a distance between at least two of the plurality of generated persistence diagrams, wherein the distance represents an anomaly score associated with a change in the topology of the network; and identify a difference between the first and second sets of correlations between the network metrics as a network anomaly based on the anomaly score.

9. The apparatus as in claim 8, wherein the process when executed is further operable to:

generate an alert indicative of the network anomaly.

10. The apparatus as in claim 8, wherein the process when executed is further operable to:

project the first and second pluralities of measurements onto one or more hyperplanes that each comprise a hash function, to generate measurement signatures; and use the measurement signatures to determine the first and second sets of correlations.

11. The apparatus as in claim 10, wherein the measurement signatures comprises hashes of the projected first and second pluralities of measurements.

12. The apparatus as in claim 8, wherein the process when executed is further operable to:

perform spectral analysis on the first and second pluralities of measurements, to determine the first and second sets of correlations.

13. The apparatus as in claim 8, wherein the topological features comprise clusters and holes of one or more manifolds in which measurements from the first or second pluralities of measurements are data points in the one or more manifolds.

14. The apparatus as in claim 8, wherein the network metrics comprise at least one of: a byte size of a traffic flow, a time associated with a traffic flow, or an available resource of a node in the network.

15. A tangible, non-transitory, computer-readable medium storing program instructions that cause a device in a network to execute a process comprising:

receiving a first plurality of measurements for network metrics captured during a first time period;

determining a first set of correlations between the network metrics using the first plurality of measurements captured during the first time period;

receiving a second plurality of measurements for the network metrics captured during a second time period;

determining a second set of correlations between the network metrics using the second plurality of measurements captured during the second time period;

in response to determining the first and second sets of correlations, generating a plurality of persistence diagrams based on the first and second sets of correlations as sets, each diagram of the plurality of persistence diagrams a set of topological features associated with the first and second sets of correlations;

computing a distance between the generated persistence diagrams, wherein the distance represents an anomaly score; and identifying a difference between the first and second sets of correlations between the network metrics as a network anomaly based on the anomaly score.

16. The computer-readable medium as in claim 15, wherein the process further comprises:

generating an alert indicative of the network anomaly.

17. The computer-readable medium as in claim 15, wherein the process further comprises:

performing spectral analysis on the first and second pluralities of measurements, to determine the first and second sets of correlations.

18. The computer-readable medium as in claim 15, wherein the process further comprises:

using locality-sensitive hashing to identify the network anomaly.

* * * * *